June 12, 1928.
W. G. ALLEN
1,673,175
SYSTEM OF GRADING MATERIALS
Filed June 26, 1925   2 Sheets-Sheet 2
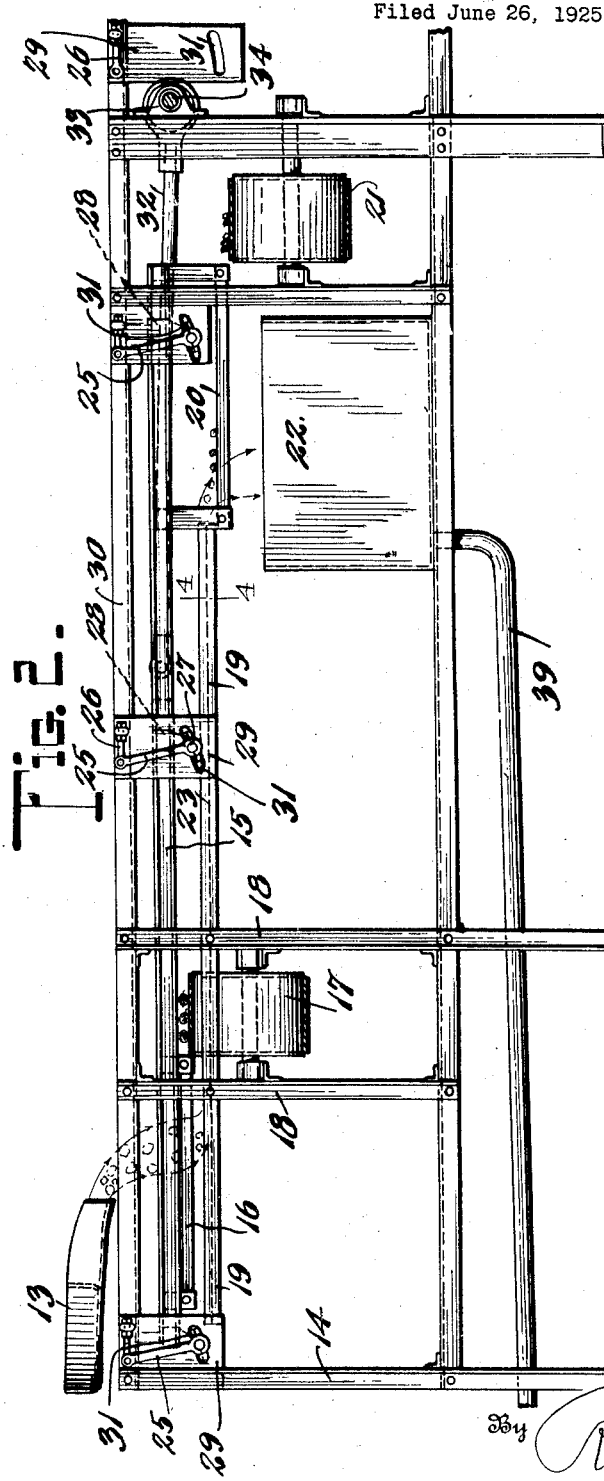
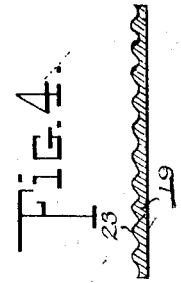
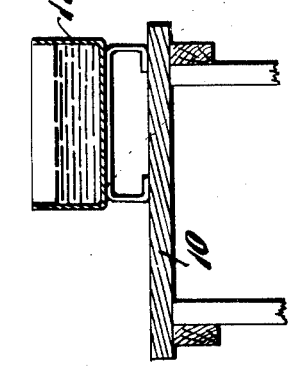
Inventor
William G. Allen
By Robb, Robb & Hill
Attorneys Patented June 12, 1928.

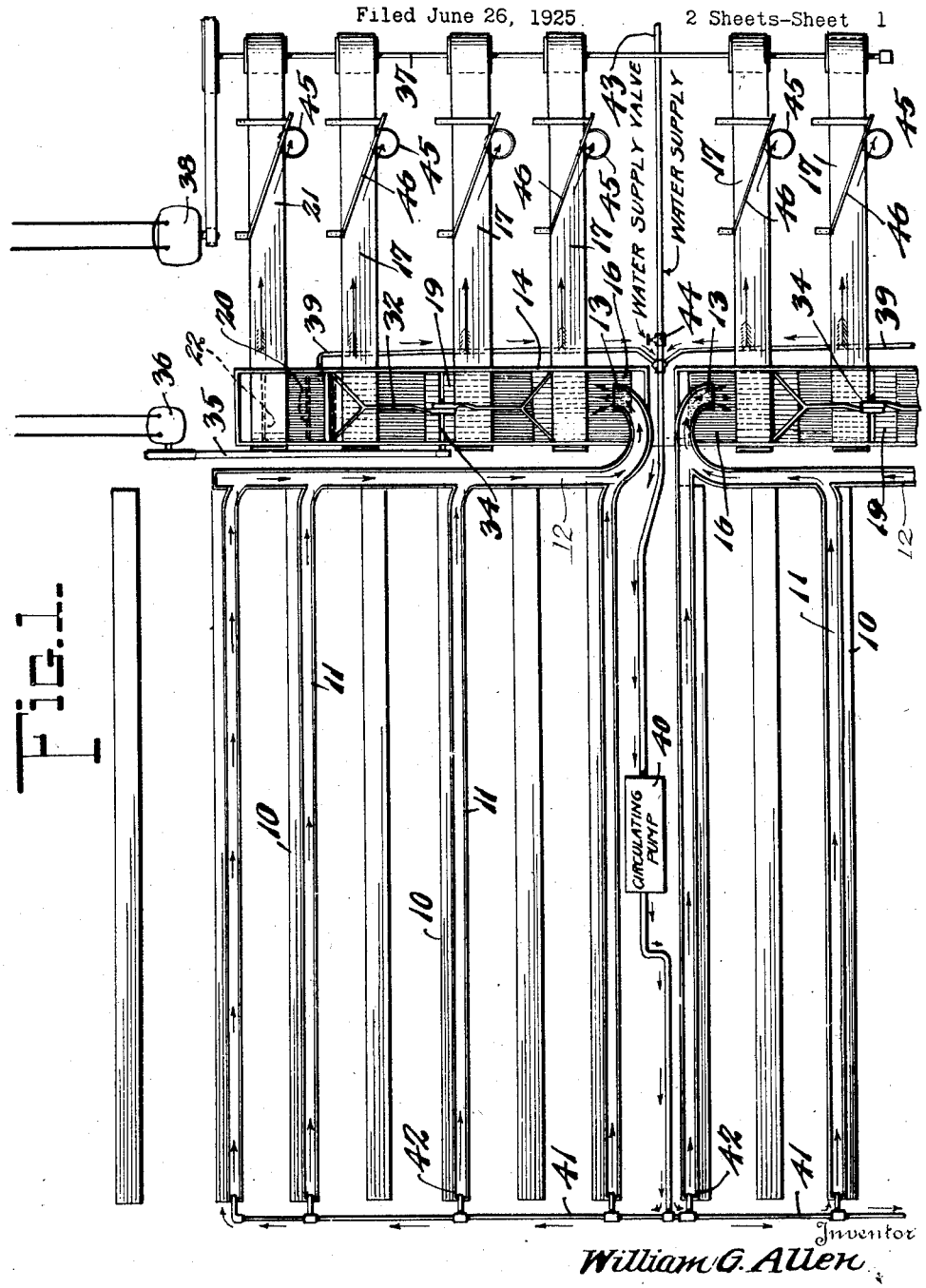

1,673,175

UNITED STATES PATENT OFFICE.

WILLIAM G. ALLEN, OF SALEM, OREGON.

SYSTEM OF GRADING MATERIALS.

Application filed June 26, 1925. Serial No. 39,766.

This invention relates to a system for grading materials employing a liquid conducting medium for conveying the material from a position for preparation to and through a grading device.

While the system is adapted for general application, still it is specifically designed for use with fresh or green fruits and presents one means for carrying out the method of grading presented in my co-pending application filed June 26, 1925, Serial Number 39,765. The system provides for a complete treatment of the fruit to be canned from the time of its receipt until it is deposited into the containers and the fruit is primarily prepared by hulling or selection at a table for that purpose and then deposited into a conduit carrying a body of flowing water by which it is delivered in a separated condition to the reticulated surface of a grading device. The larger fruit passes over the surface of the grader while the smaller fruit with the body of liquid passes through this surface and is received by a water table which conducts it to a succeeding surface, and this operation is repeated to the desired extent for separating the different grades. At the final point of separation the water is collected in a suitable receptacle and then returned by a circulating pump to the original trough or conduit disposed at the preparation table. The system provides for the collection of the separated fruit at these different stages and its conveyance to a point of deposit into a container.

The immersion of the fruit in a body of water causes a reduction of the temperature thereof which prevents deterioration and oxidation by firming the fruit and also cleanses the same in its passage to the grader. The fruit when carried in such a liquid body remains separated so that it is delivered in a comparatively uniform layer to the grading surface effecting the most efficient results and the fruit carried through said surface is cushioned by the body of water which when reaching the water table is conducted thereover in a series of parallel streams so that the fruit is conveyed by the gravity flow of the water while suitable agitating means may be used for the grading surfaces to conduct the fruit thereon to the delivery conveyers.

The invention has for an object to provide a novel and improved construction of grading system embodying a place of preparation for the material to be graded, and a grader with a liquid conductor for the material extending from said place and discharging the fruit in separated condition at the grading surface.

Another object of the invention is to provide a grading system in which the conducting liquid carrying the material passes from one grading surface to a succeeding surface and conveys in separated condition the material which passes through each of the successive grading surfaces.

A further object of the invention is to provide a system by which material may be conveyed from a point of preparation by a fluid medium and separated into different grades at the discharge from the grading surfaces, the results of said separation being separately delivered together with means by which the liquid is collected at the termination of the separation and conducted to the initial point of operation so that it may be repeatedly used to the desired extent.

Other objects and advantages of the invention will be hereinafter set forth and the novel features thereof defined by the appended claims.

In the drawings:—

Figure 1 is a plan showing the system applied to a series of preparation tables and a plurality of graders;

Fig. 2 is a side elevation of a form of grader adapted for this system of separation;

Figure 3 is a detail section through one of the preparation tables and Figure 4 is an enlarged section on the line 4—4 of Figure 2.

This system of separation is adapted to be used in connection with various forms of graders embodying a reticulated grading surface and a fixed water table conducting from one surface to another. For the purpose of illustration I have shown one form of such grader, such being more specifically shown and described in my co-pending application for grader filed June 26, 1925, Serial Number 39,767.

In the drawing like numerals refer to like parts in the several figures, and the numeral 10 designates a series of preparation tables which may be of any desired character and at which the fruit is hulled or otherwise prepared for canning and then deposited in the troughs 11 arranged above the table and carrying a stream of flowing liquid such as water. Where a series of tables are used these troughs 11 are connected with a trunk trough 12 which discharges at 13 upon the upper surface of a grader 14, thus providing for a collection and centralized discharge from the several troughs at the preparation tables.

The form of grader herein shown comprises a reciprocating or vibrating frame 15 having suspended therefrom at its upper end a grading surface 16 composed of a series of parallel bars suitably spaced apart to determine the first or primary grade, and the liquid carrying the fruit passes through these bars and deposits thereon such fruit as is of greater diameter than the spaces between the bars. This first grade of fruit is deposited by the movement of the grader upon the delivery conveyer 17 mounted in the usual manner upon the uprights 18 of the frame.

Extending beneath the grading surface 16 is a fixed corrugated or channeled water table 19 supported by the frame of the grader and discharging at its lower end upon a second grading surface 20 which is suspended from the frame 15 above described. The fruit retained by this latter grading surface is deposited upon a delivery conveyer 21 while the liquid passing therethrough enters a tank 22 or other suitable receptacle. Any desired number of grading surfaces may be provided, they being formed of differently spaced bars and disposed in successively lower planes so as to effect a feed by gravity both upon the grading surface and of the liquid upon the water table. This water table extends for the width of the grader and the water normally passing through the collecting troughs is not sufficient to form a complete stream over the same and conveys the fruit and liquid medium in a relatively narrow stream which is spread laterally into a thin wide stream by the provision of the channeled or corrugated surface 23 which causes the water and fruit to traverse parallel channels having sufficient depth to properly float the fruit and deliver it in a uniform layer upon the succeeding grading surface.

The vibrating frame 15 may be supported and actuated in any preferred manner, for instance as shown in Figure 2 hanger links 25 are pivotally mounted upon posts 26 and also pivotally connected at their lower ends to a pivot 27 carried by a bracket 28 depending from the frame 15. This pivot extends through a supporting plate 29 connected to the upper rail 30 of the grader frame and to the water table 19 and suitably slotted at 31 to permit oscillatory movement of the link. Motion is transmitted to the frame 15 by means of a pitman 32 extending from a cam member 33 upon the driving shaft 34 actuated by any suitable power connection such as the belt 35 extending from the motor 36 as in Figure 1.

The several delivery belts may also be driven by a common shaft as at 37 driven from a motor 38. The liquid supply is adapted to be conserved by returning the water from the collecting tank 22 at the delivery of the grader to the several troughs at the preparation tables and this is effected by means of a conducting pipe 39 extending to a circulating pump 40 from which a discharge pipe 41 passes and is provided with means 42 delivering into each of the troughs. When it is desired to add additional liquid this may be supplied by the pipe 43 controlled by a suitable valve 44. In the travel of the delivered fruit in different grades upon the conveyer 17 it is adapted to be discharged automatically into cans or containers as indicated at 45 by means of a guide 46 disposed in proper relation to the upper face of the belt so as to force the fruit toward one edge thereof beneath which the can is disposed.

It will be seen that the foregoing system provides for the continuous conduction of the fruit from its point of preparation to its position for delivery into a packing container, and that the movement of the fruit or material is effected by a flotation thereof in a body of liquid both to and through the grading mechanism wherein the liquid prevents the fruit from directly contacting with the table below when dropping through the grading surfaces and conveys the fruit in parallel streams over such surfaces providing for a direct and positive feed which prevents injury to fresh or ripe fruit and also benefiting the condition of such fruit due to the presence of the water during the grading action.

It will be understood that the successive grading surfaces as shown in Figure 1 are differently spaced so as to effect the number of grades desired and these surfaces are simultaneously vibrated or reciprocated to secure a feeding action of the fruit thereon for delivery to the belts. The water tables, however, are fixed in relation to the grader frame and the liquid carrying the material to be graded flows by gravity over the successive tables.

While the specific mechanism used in this system of grading has been shown and decribed, the invention involved is not confined thereto and changes and alterations may be made in such apparatus without departing from the spirit of the invention as defined by the appended claims.

Having thus described my invention, what I claim as new and desire to secure by Letters Patent is:

1. In a grading system, a conducting conduit adapted to carry a flowing body of liquid to convey the material, a grader having a reticulated surface disposed in a substantially horizontal plane to receive the discharge from said conduit, and a water table disposed beneath said surface and provided at its upper face with means to produce individual streams of liquid thereover and discharging upon a succeeding grading surface.

2. In a grading system, a conducting conduit adapted to carry a flowing body of liquid to convey the material, a grader having a reticulated surface disposed in a substantially horizontal plane to receive the discharge from said conduit, and a water table disposed beneath said surface and discharging upon a succeeding grading surface, said table being provided with a channeled surface to conduct the liquid and material in parallel streams.

3. In a grading system, a conducting conduit adapted to carry a flowing body of liquid to convey the material, a grader having a reticulated surface disposed to receive the discharge from said conduit, a water table disposed beneath said surface and provided at its upper face with means to produce individual streams of liquid thereover and discharging upon a succeeding grading surface, a receptacle for collecting the liquid at the point of final grading, and circulating means for conducting the liquid from said receptacle to the initial conveying conduit.

4. In a grading system, a conducting conduit adapted to carry a flowing body of liquid into which the material is introduced, a grader having a reticulated surface disposed to receive the discharge from said conduit, a water table disposed beneath said surface and constructed upon its upper face with channels to divide the liquid carrying the material into individual streams discharging upon a succeeding grading surface, and a transverse conveyor disposed to receive the material in separated condition across the delivery end of said water table.

5. In a grading system, a liquid conductor for conveying the material in suspension, a grader disposed to receive such material and liquid, and a water table adapted to conduct the liquid and material from one grader to another and formed with a series of parallel channels to divide the liquid into individual streams and separately present the material carried thereby to deliver the same across the transverse area of said table.

6. In a grading system, a conduit containing a flowing body of liquid by which the material is conducted, a grader receiving the discharge from said conduit and provided with successive reticulated surfaces disposed in descending substantially horizontal planes, and water tables disposed beneath said surfaces and provided with means to produce separate channels of flow to conduct the liquid and material passing through one surface to the succeeding surface in individual attenuated streams.

7. In a grading system, a conduit containing a flowing body of liquid by which the material is conducted, a grader receiving the discharge from said conduit and provided with successive reticulated surfaces disposed in descending substantially horizontal planes, water tables disposed beneath said surfaces and provided with means to produce separate channels of flow to conduct the liquid and material passing through one surface to the succeeding surface in individual attenuated streams, and delivery means extending intermediate the discharge of each reticulated surface and its associated water table.

8. In a grading system, a conduit containing a flowing body of liquid by which the material is conducted, a grader receiving the discharge from said conduit and provided with successive reticulated surfaces disposed in descending substantially horizontal planes, water tables disposed beneath said surfaces and formed with longitudinally extending channels to conduct the liquid and material passing through one surface to the succeeding surface in individual streams, delivery means extending intermediate the discharge of each reticulated surface and its associated water table, and means for displacing the material from said delivery means and depositing the same in a container.

9. In a fruit grading system, a liquid conducting surface for conveying material in suspension provided with means to produce individual streams for uniformly distributing the fruit in a thin layer over said surface.

10. The system of handling fruit which consists in means for conveying said fruit and a liquid medium in a relatively narrow stream, means for spreading the fruit and liquid medium laterally into a wide and thin stream, and means for separating the fruit having one characteristic from fruit having another characteristic.

In testimony whereof I affix my signature.

WILLIAM G. ALLEN.